US008708051B2

(12) United States Patent
McDowell et al.

(10) Patent No.: US 8,708,051 B2
(45) Date of Patent: Apr. 29, 2014

(54) ISOLATION VALVE WITH DEBRIS CONTROL AND FLOW TUBE PROTECTION

(75) Inventors: Christopher L. McDowell, New Caney, TX (US); Joe Noske, Houston, TX (US); Paul L. Smith, Katy, TX (US)

(73) Assignee: Weatherford/Lamb, Inc., Houston, TX (US)

( * ) Notice: Subject to any disclaimer, the term of this patent is extended or adjusted under 35 U.S.C. 154(b) by 323 days.

(21) Appl. No.: 12/845,899

(22) Filed: Jul. 29, 2010

(65) Prior Publication Data

US 2012/0024537 A1 Feb. 2, 2012

(51) Int. Cl.
*E21B 34/10* (2006.01)

(52) U.S. Cl.
USPC .................. 166/323; 166/332.8; 166/334.1

(58) Field of Classification Search
USPC ........... 166/323, 334.1, 334.2, 386, 375, 373, 166/332.8
See application file for complete search history.

(56) References Cited

U.S. PATENT DOCUMENTS

| | | | |
|---|---|---|---|
| 4,161,985 A | 7/1979 | Fournier et al. | |
| 4,294,314 A | 10/1981 | Miyagishima et al. | |
| 4,411,316 A * | 10/1983 | Carmody | 166/323 |
| 4,577,694 A * | 3/1986 | Brakhage, Jr. | 166/382 |
| 4,624,315 A | 11/1986 | Dickson et al. | |
| 4,660,646 A * | 4/1987 | Blizzard | 166/321 |
| 4,846,281 A | 7/1989 | Clary et al. | |
| 5,137,090 A | 8/1992 | Hare et al. | |
| 6,209,663 B1 | 4/2001 | Hosie | |
| 6,227,299 B1 | 5/2001 | Dennistoun | |
| 6,328,109 B1 * | 12/2001 | Pringle et al. | 166/373 |
| 7,243,728 B2 * | 7/2007 | Stoesz et al. | 166/318 |
| 7,255,174 B2 | 8/2007 | Thompson | |
| 7,537,062 B2 | 5/2009 | Hughes et al. | |
| 8,261,836 B2 * | 9/2012 | Noske et al. | 166/332.8 |
| 2002/0070028 A1 | 6/2002 | Garcia et al. | |

(Continued)

FOREIGN PATENT DOCUMENTS

| | | |
|---|---|---|
| EP | 0915230 A2 | 5/1999 |
| GB | 240516 A | 10/1925 |
| GB | 2297572 A | 8/1996 |
| GB | 2405165 A | 2/2005 |

OTHER PUBLICATIONS

Australian Patent Examination Report No. 1 dated Nov. 30, 2012, Australian Patent Application No. 2011204953.

(Continued)

*Primary Examiner* — Shane Bomar
*Assistant Examiner* — Kipp Wallace
(74) *Attorney, Agent, or Firm* — Patterson & Sheridan, L.L.P.

(57) ABSTRACT

The present invention generally relates to an isolation valve with debris control. In one aspect, an isolation valve for use as part of a casing string is provided. The isolation valve includes a housing having a bore and a valve cavity. The isolation valve further includes a valve member movable between a first position in which the valve member obstructs the bore of the housing and a second position in which the valve member is disposed in the valve cavity. Further, the isolation valve includes a flow tube configured to allow movement of the valve member between the first and second positions. Additionally, the isolation valve includes an engagement assembly adapted to engage the flow tube to substantially prevent debris from entering the valve cavity when the valve member is in the second position. In another aspect, a method of operating an isolation valve in a wellbore is provided.

20 Claims, 12 Drawing Sheets

(56) References Cited

U.S. PATENT DOCUMENTS

| | | | |
|---|---|---|---|
| 2005/0039922 A1 | 2/2005 | Vick et al. | |
| 2005/0230118 A1 | 10/2005 | Noske et al. | |
| 2007/0158082 A1* | 7/2007 | Williamson | 166/386 |
| 2008/0245531 A1 | 10/2008 | Noske et al. | |
| 2010/0089583 A1 | 4/2010 | Xu et al. | |
| 2010/0294502 A1 | 11/2010 | Xu | |

OTHER PUBLICATIONS

Canadian Office Action dated Dec. 19, 2012, Canadian Patent Application No. 2,745,941.

Canadian Office Action for Application No. 2,745,941 dated Sep. 25, 2013.

* cited by examiner

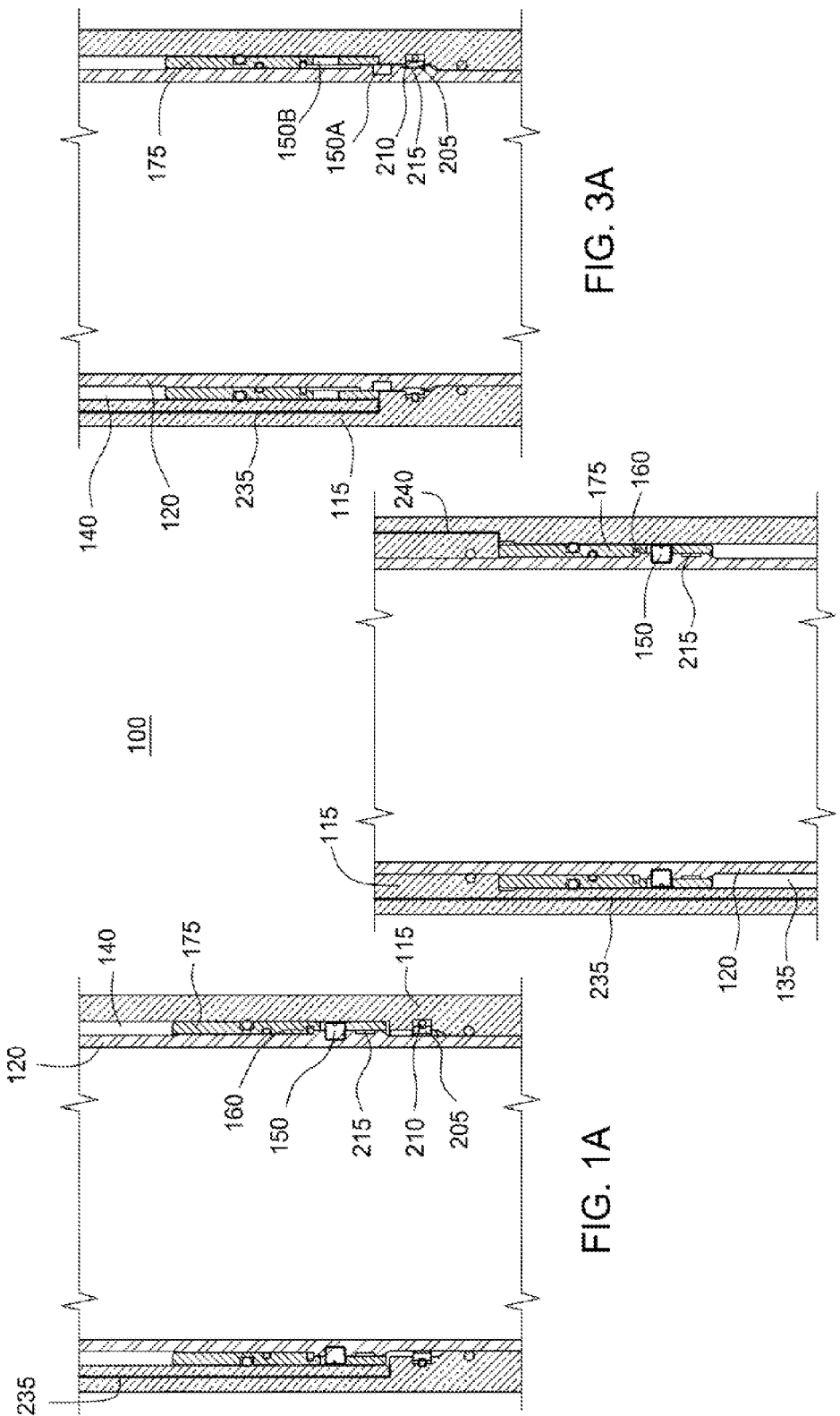

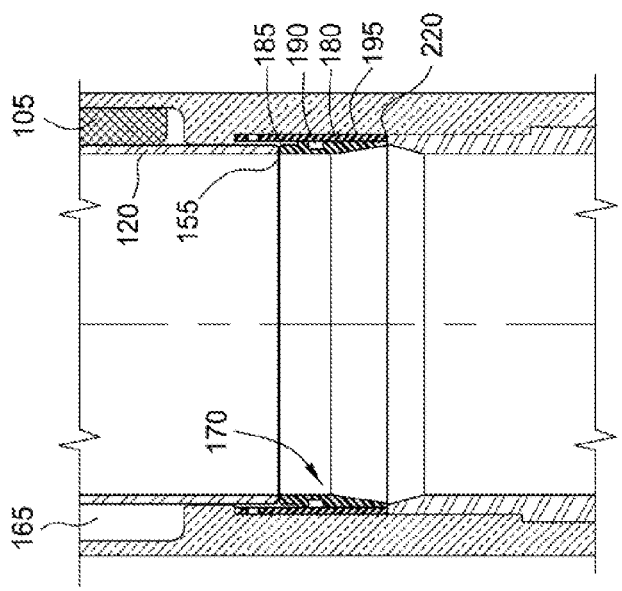
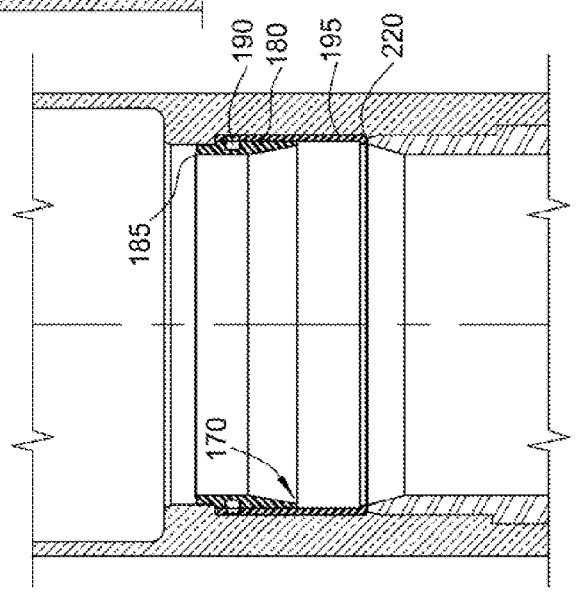
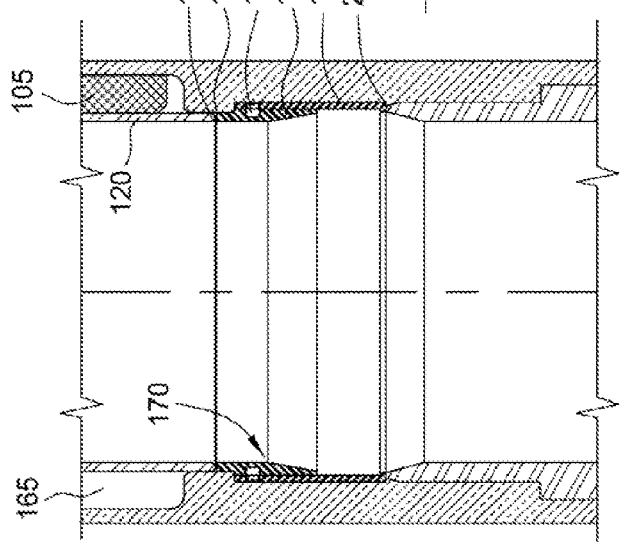

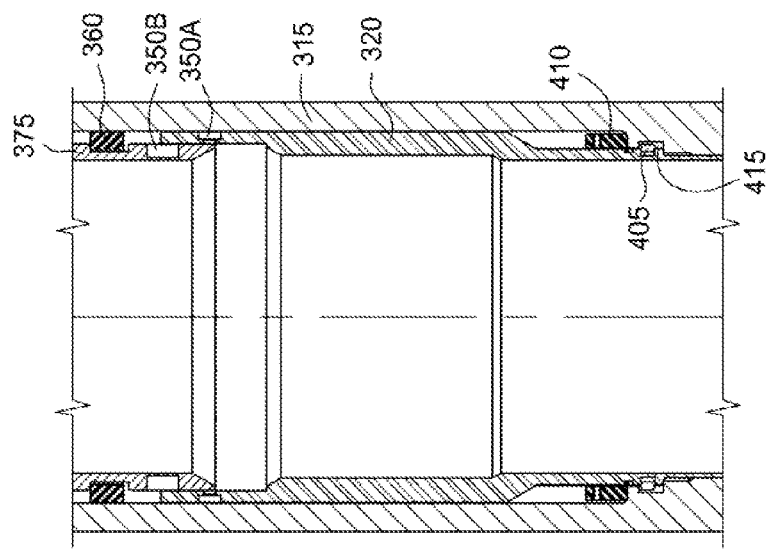
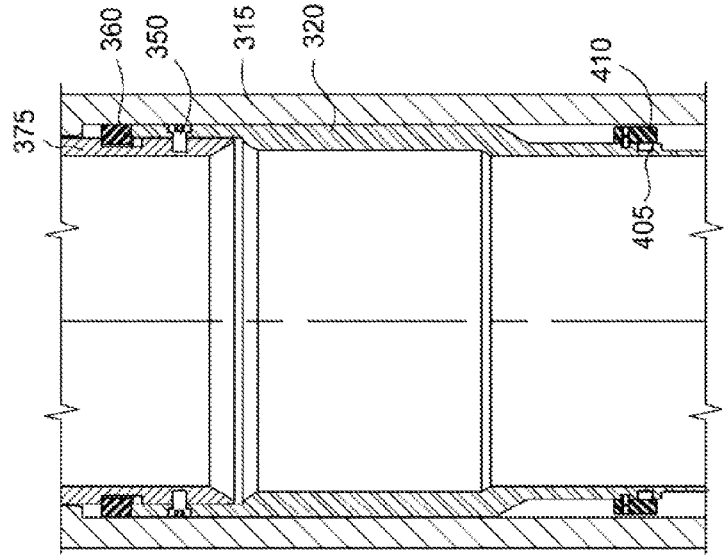
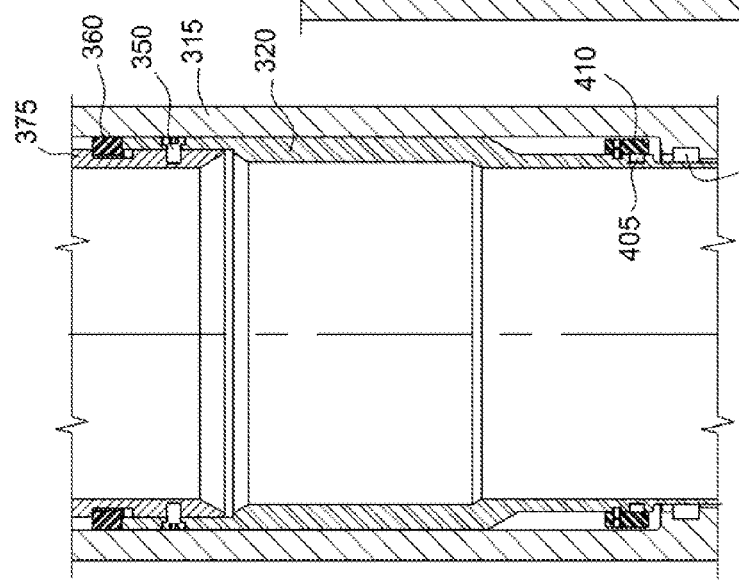

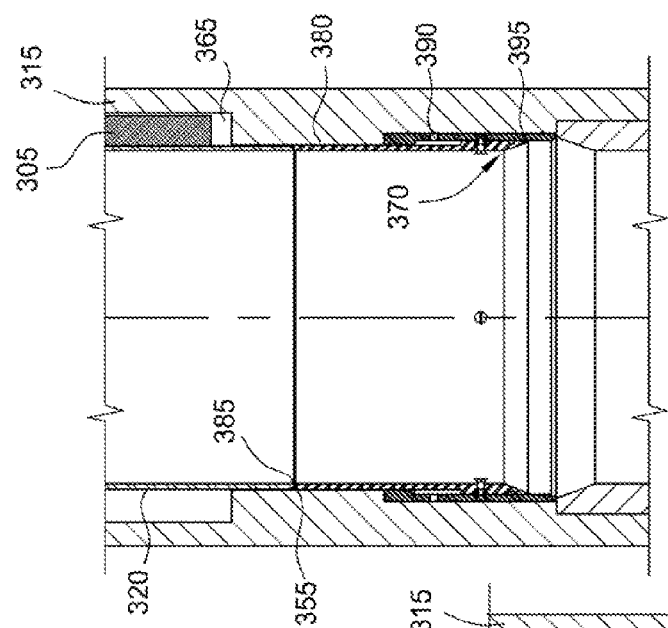
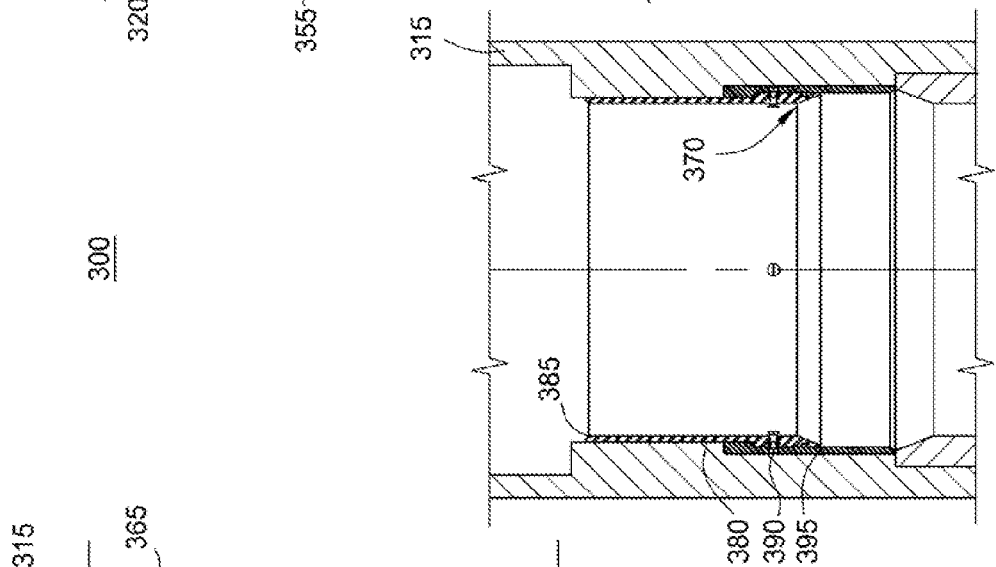
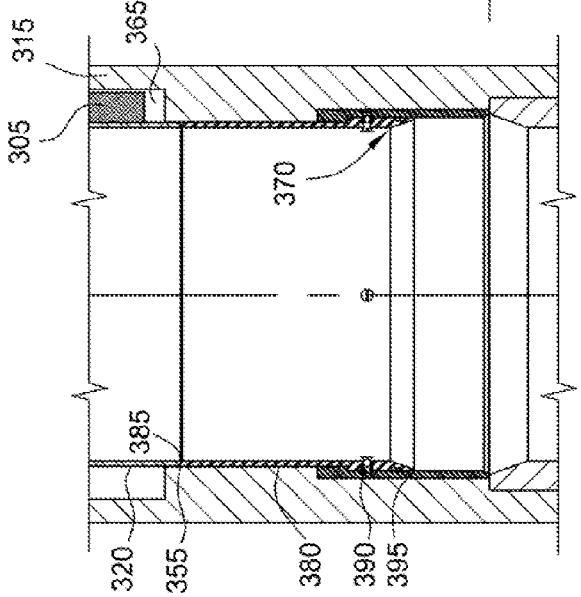

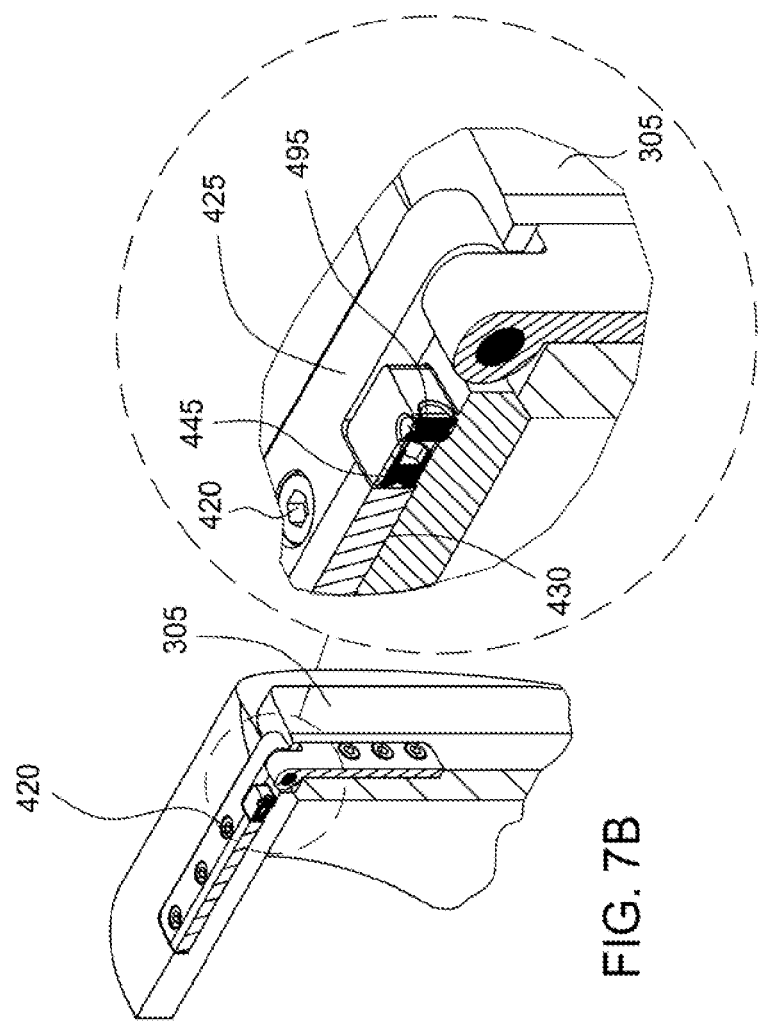
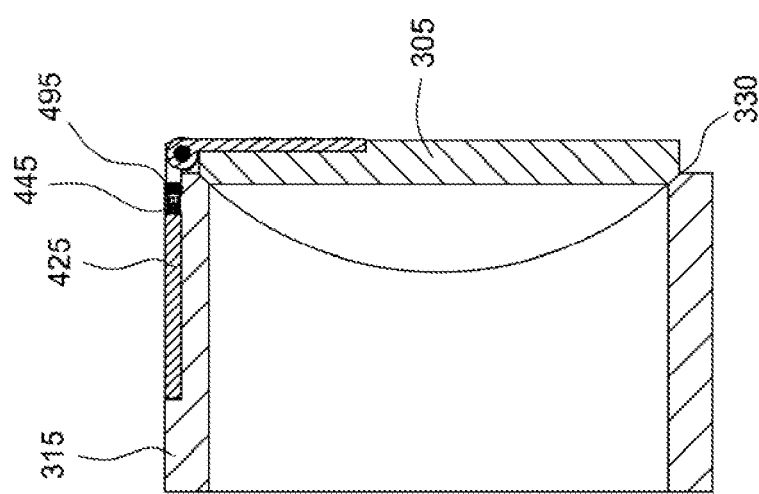
FIG. 7C
FIG. 7B
FIG. 7A

ISOLATION VALVE WITH DEBRIS CONTROL AND FLOW TUBE PROTECTION

BACKGROUND OF THE INVENTION

1. Field of the Invention

Embodiments of the invention generally relate to methods and apparatus for use in oil and gas wellbores. More particularly, the invention relates to an isolation valve with debris control and flow tube protection.

2. Description of the Related Art

An isolation valve is located as part of the casing string and operated through a control line. The isolation valve is configured to temporarily isolate a formation pressure below the isolation valve such that a tool string may be quickly and safely tripped into a portion of the wellbore above the isolation valve that is temporarily relieved to atmospheric pressure. Thus, the isolation valve allows the tool string to be tripped into and out of the wellbore at a faster rate than snubbing in the tool string under pressure. Since the pressure above the isolation valve is relieved, the tool string can trip into the wellbore without wellbore pressure acting to push the tool string out.

The isolation valve is movable between an open position and a closed position by selectively actuating a flapper valve of the isolation valve. The flapper valve is actuated by the movement of a flow tube in the isolation valve. In the closed position, the flapper valve obstructs a bore through the isolation valve, and in the open position, the flapper valve resides in a flapper valve cavity. Prior designs for the isolation valve can suffer from various disadvantages. One disadvantage of prior designs is that debris and mud may enter the flapper valve cavity during operation of the isolation valve. The debris and mud may inhibit the function of the flapper valve and thereby affect the opening and/or closing of the isolation valve. Another disadvantage of prior designs is that an end of the flow tube oftentimes becomes damaged while stripping or tripping the drill string through the isolation valve. The damaged flow tube may subsequently cause damage to the flapper valve as the flow tube moves through the isolation valve. Therefore, there exists a need for an improved isolation valve assembly and associated methods.

SUMMARY OF THE INVENTION

The present invention generally relates to an isolation valve with debris control. In one aspect, an isolation valve for use as part of a casing string is provided. The isolation valve includes a housing having a bore and a valve cavity. The isolation valve further includes a valve member movable between a first position in which the valve member obstructs the bore of the housing and a second position in which the valve member is disposed in the valve cavity. Further, the isolation valve includes a flow tube configured to allow movement of the valve member between the first and second positions. Additionally, the isolation valve includes an engagement assembly adapted to engage the flow tube to substantially prevent debris from entering the valve cavity when the valve member is in the second position.

In another aspect, a method of operating an isolation valve in a wellbore is provided. The method includes the step of placing the isolation valve in the wellbore. The isolation valve includes a housing, a valve member, a flow tube, a piston and an engagement assembly. The method further includes the step of moving the valve member into a bore of the housing to obstruct a flow path through the isolation valve. The method also includes the step of moving the flow tube into interference with the valve member to open the flow path through the isolation valve. Additionally, the method includes the step of moving the flow tube into engagement with the engagement assembly to protect the valve member from debris.

In yet a further aspect, an isolation valve is provided. The isolation valve includes a housing having a bore. The isolation valve further includes a flapper pivotally movable between a closed position in which the bore is blocked and an opened position in which the bore is open to fluid flow. The isolation valve also includes a movable flow tube for shifting the flapper between the opened position and the closed position. Additionally, the isolation valve includes an engagement assembly adapted to engage the flow tube when the flapper is in the opened position.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 1A and 1B are enlarged views of the isolation valve illustrated in FIG. 1.

FIGS. 2A and 2B are enlarged views of the isolation valve illustrated in FIG. 2.

FIGS. 3A and 3B are enlarged views of the isolation valve illustrated in FIG. 3.

FIGS. 4A and 4B are enlarged views of the isolation valve illustrated in FIG. 4.

FIGS. 5A and 5B are enlarged views of the isolation valve illustrated in FIG. 5.

FIGS. 6A and 6B are enlarged views of the isolation valve illustrated in FIG. 6.

FIGS. 7A-7C illustrate a hinge arrangement for a flapper valve.

DETAILED DESCRIPTION

Embodiments of the present invention generally relate to an isolation valve with flow tube protection. The isolation valve may be a downhole deployment valve or a formation deployment valve. To better understand the aspects of the present invention and the methods of use thereof, reference is hereafter made to the accompanying drawings.

Figure 1:
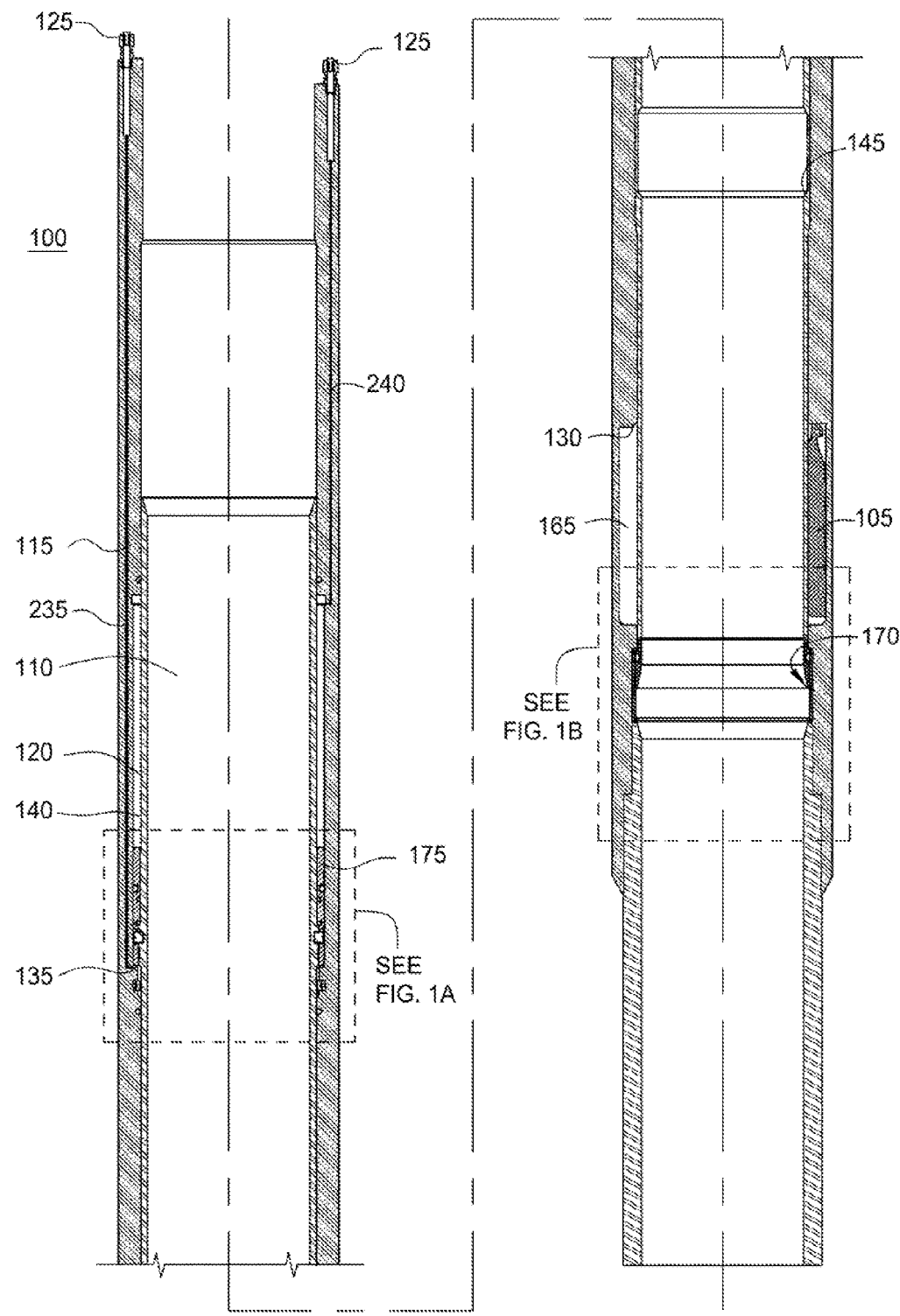
FIG. 1 is a cross-section view of an isolation valve in an open position, according to one embodiment of the invention.

FIG. 1 shows a cross-section view of an isolation valve 100 in an open position to thereby enable tools such as a drill string to pass through a longitudinal central bore 110 of the isolation valve 100. The isolation valve 100 includes an outer housing 115 with a flow tube 120 disposed within the housing 115. The flow tube 120 represents an exemplary mechanism for moving a flapper 105 to open and close the isolation valve 100, although other types of actuators may be used in some embodiments. In one embodiment, the flapper 105 may be biased in toward the closed position and may reside in a flapper cavity 165 when in the open position. The flow tube 120 may move within the housing 115 based on control signals received to selectively displace the flapper 105 between the open position and the closed position. The flow tube 120 moves across an interface between the flapper 105 and a seat 130 to engage and urge the flapper 105 to the open position or disengage and allow the flapper to return to the closed position. As will be described herein, the flow tube 120 covers the flapper 105 when the isolation valve 100 is in the open position to at least inhibit debris and drilling fluid from collecting around the flapper 105 and the flapper cavity 165. Build-up of solids between a backside surface of the flapper 105 and the housing 115 can impede the flapper 105 from moving to the closed position after withdrawing the flow tube 120 out of interference with the flapper 105.

The isolation valve 100 includes control line connections 125 at an end of the housing 115 that are in communication with control lines (not shown). The control lines provide fluid via fluid channels 235, 240 to first and second piston chambers 135, 140 that are defined between the housing 115 and the flow tube 120. A piston 175 spans an annular area between the housing 115 and the flow tube 120 to define and isolate the first and second chambers 135, 140 from one another. The piston 175 is movable to change the relative sizes of the chambers 135, 140.

Figure 3:
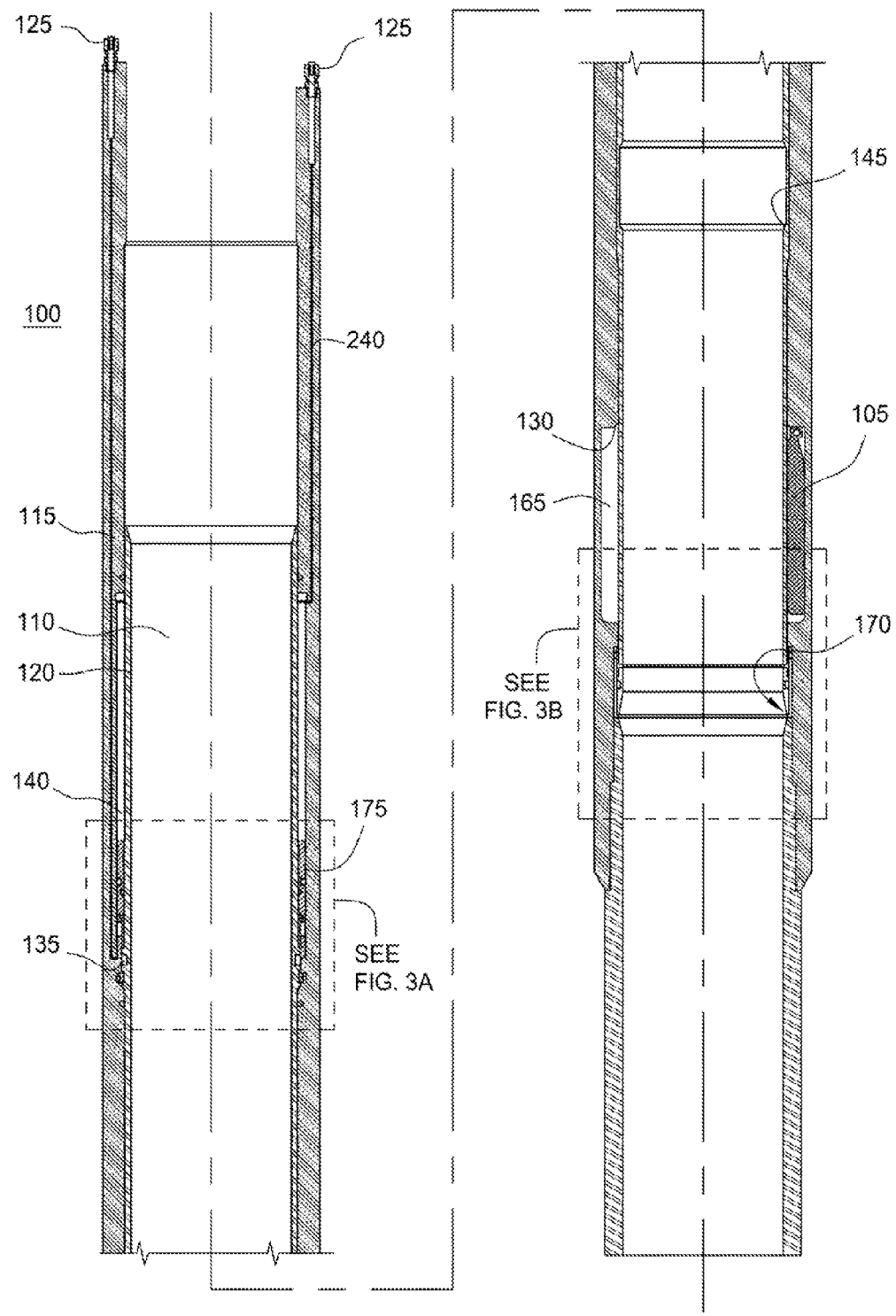
FIG. 3 is a cross-section view of the isolation valve in a locked position.

As shown in FIG. 1A, the piston 175 is attached to the flow tube 120 via a releasable member 150, such as a shear pin. Fluid pressure can be introduced into the second piston chamber 140 through the channel 240 to act on the piston 175. The fluid pressure moves the piston 175 and the attached flow tube 120 in a first direction to open the isolation valve 100. In this respect, the flow tube 120 contacts the flapper 105 and urges the flapper 105 toward the flapper cavity 165. To return to the closed position, fluid pressure is introduced in the first piston chamber 135 via the channel 235 to act on the piston 175. The fluid pressure moves the piston 175 and the attached flow tube 120 in a second opposite direction to slide the flow tube 120 out of interference with the flapper 105. The isolation valve 100 may be movable between the open position and the closed position multiple times by introducing fluid pressure in the respective piston chamber 135, 140. As also shown in FIG. 1A, a biasing member 160 is disposed between the flow tube 120 and the piston 175. The biasing member 160 is configured to allow the flow tube 120 to move relative to the piston 175 by compressing the biasing member 160. The biasing member 160 may be an elastomer, a spring or any other type of biasing member known in the art. As also shown in FIG. 1A, a lock member 205 (such as a lock ring) is disposed within the housing 115. The lock member 205 is compressed and held in place by a shear ring 210. As will be discussed herein, the lock member 205 is configured to interact with a groove 215 in the flow tube 120 when the isolation valve 100 is moved to a locked position (FIG. 3).

As shown in FIG. 1B, the isolation valve 100 further includes an engagement assembly 170. The engagement assembly 170 is configured to interact with the flow tube 120 when the isolation valve 100 is in the open position in order to protect (and/or seal) the flapper cavity 165 from debris. In this respect, the engagement assembly 170 may be placed below the flapper cavity 165. In one embodiment, the engagement assembly 170 includes a guide member 180 and a sleeve member 195 that are interconnected via a shearable member 190. The guide member 180 may include a tapered inner surface that is configured to centralize a drill string and/or other tools passing through the isolation valve 100. In addition, the engagement assembly 170 is configured to protect the end of the flow tube 120 from damage due to the movement of the drill string and other tools through the isolation valve 100. In this embodiment, the engagement assembly 170 may absorb impact from the drill string because it is the first (or lowest) component in the isolation valve 100, which is in contact with the drill string as the drill string moves upward through the bore 110 of the isolation valve 100, the engagement assembly 170 substantially shields the flow tube 120 from any damage that may occur. In addition, the engagement assembly may direct the drill string (using the tapered surface) into the inner diameter of the flow tube 120, thereby protecting the end profile of the flow tube 120. The engagement assembly 170 may also direct debris into the inner diameter of the flow tube 120 to prevent packing off of the flapper cavity 165. In this manner, the engagement assembly 170 may shield the flow tube 120 from damage that may occur as the drill string or fluid moves upward through the bore 110 of the isolation valve 100.

During opening of the isolation valve 100, the piston 175 moves the flow tube 120 in a direction toward the engagement assembly 170 when fluid pressure is introduced into the second piston chamber 140 via the channel 240. The flow tube 120 continues in the direction until a lower portion 155 of the flow tube 120 contacts an upper portion 185 of the guide member 180. In one embodiment, the lower portion 155 of the flow tube 120 includes a shaped surface, such as a bull-nosed shape, which is configured to contact with a surface on the upper portion 185 of the guide member 180. In one embodiment, the surface on the upper portion 185 is shaped to mate with the shaped surface. The flow tube 120 and the guide member 180 are optionally biased against each other to maintain contact between the flow tube 120 and the guide member 180 after the isolation valve 100 is in the open position. In the embodiment illustrated, the biasing member 160 (FIG. 1A) is used to bias the flow tube 120 against the guide member 180 of the engagement assembly 170. In another embodiment, a biasing member may be placed in between the components of the engagement assembly 170. In further embodiment, a biasing member may be placed in the engagement assembly 170 and in the flow tube 120. The biased contact arrangement is optionally used to maintain contact between the flow tube 120 and the guide member 180, and in this manner the flapper cavity 165 is protected from debris that may restrict the operation of the flapper 105.

Figure 2:
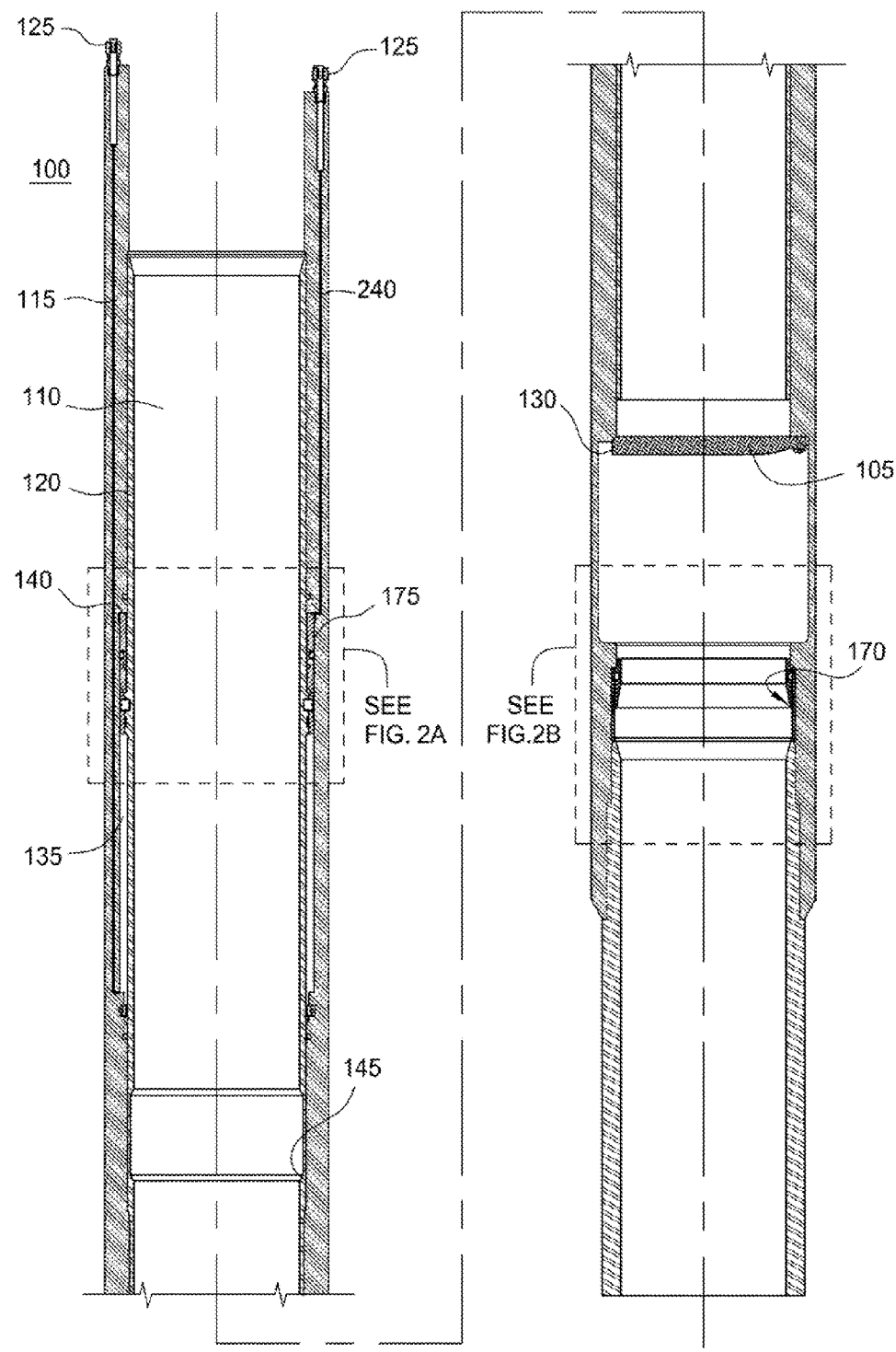
FIG. 2 is a cross-section view of the isolation valve in a closed position.

FIG. 2 illustrates a cross-section view of the isolation valve 100 in a closed position. As shown, the flapper 105 is obstructing the longitudinal central bore 110 through the isolation valve 100. To close the isolation valve 100, fluid pressure is supplied to the first piston chamber 135 (see FIG. 2A) via the channel 235, which moves the flow tube 120 out of interference with the flapper 105. Because the flapper 105 is biased toward the seat 130, movement of the flow tube 120 out of interference with the flapper 105 allows the flapper 105 to move toward the seat 130. The seat 130 is a portion of the isolation valve 100 that engages the flapper valve 105 when the isolation valve 100 is in the closed position. The seat 130 may be part of the housing 115, or the seat 130 may be a separate component in the isolation valve 100. Additionally, as the flow tube 120 moves through the housing 115, the flow tube 120 disengages from the guide member 180 of the engagement assembly 170 (see FIG. 2B).

FIG. 3 illustrates a cross-section view of the isolation valve 100 in a locked position. As set forth herein, the isolation valve 100 is movable between the open position and the closed position multiple times by introducing fluid pressure in the respective piston chamber 135, 140. The isolation valve 100 may be locked in the open position by manipulating the location of the flow tube 120. The flow tube 120 includes inner mating profiles 145 that enable engagement of the flow tube 120 with a corresponding profile tool (not shown) for manipulating the location of the flow tube 120. To permit free movement of the flow tube 120 relative to the piston 175, a predetermined force is required to break the releasable member 150 between the flow tube 120 and the piston 175. Upon application of the predetermined force using the profile tool, the releasable member may break into a first portion 150A and a second portion 150B (see FIG. 3A). Thereafter, the flow tube 120 is allowed to move through the housing 115 a distance that is greater than a distance traveled when the isolation valve 100 is moved to the open position. As the flow tube 120 moves through the housing 115, the groove 215 moves to a location adjacent the lock member 205 to allow the lock member 205 to engage the groove 215. Upon engagement of the lock member 205 in the groove 215, the flow tube 120 is locked in the open position, and the flow tube 120 will no longer be able to move to close the isolation valve 100. In addition, as the flow tube 120 moves through the housing 115, the sleeve contacts and acts on the guide member 180, which causes the shearable member 190 to shear. Thereafter, the guide member 180 moves relative to the sleeve member 195 until the guide member 180 contacts a shoulder 220, as shown in FIG. 3B, to accommodate the extra travel required for the flow tube 120 during the locking operation.

Figure 4:
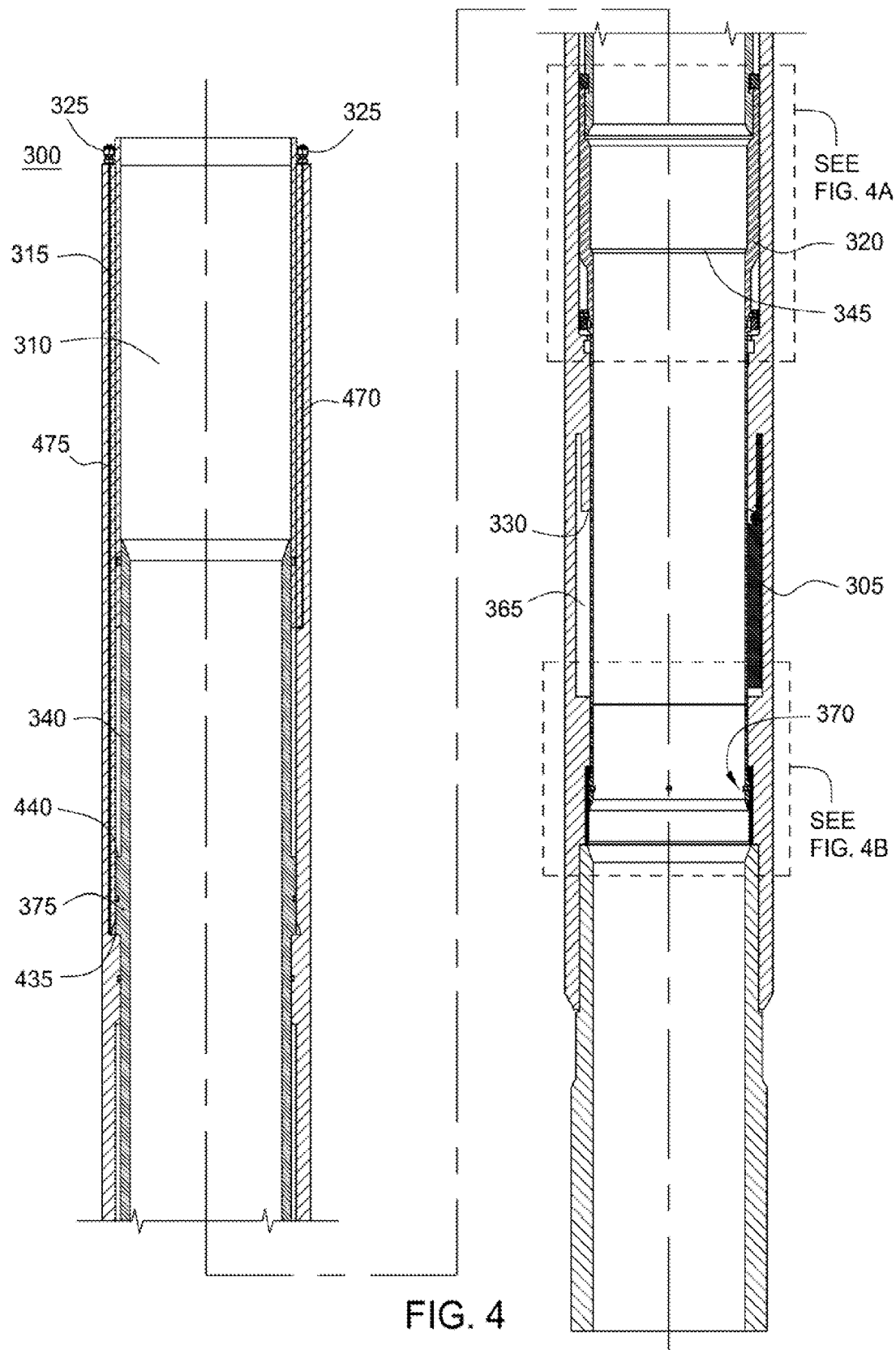
FIG. 4 is a cross-section view of an isolation valve in an open position, according to one embodiment of the invention.

FIG. 4 shows a cross-section view of another embodiment of an isolation valve 300. Similar to the isolation valve 100, the isolation valve 300 includes an engagement assembly 370 that is configured to interact with a flow tube 320 disposed within a housing 315. The engagement assembly 370 and the flow tube 320 interact when the isolation valve 300 is in the open position in order to protect (and/or seal) a flapper cavity 365 from debris that may restrict the operation of a flapper valve 305. The flow tube 320 is also used to allow a flapper valve 305 to open and close the isolation valve 300.

The isolation valve 300 includes control line connections 325 that are in communication with control lines (not shown). The control lines provide fluid to first and second piston chambers 335, 340 via fluid channels 470, 475. The first piston chamber 335 (see FIG. 5) and the second piston chamber 340 (see FIG. 4) are defined between the housing 315 and a piston sleeve 375. A piston sleeve 375 is movable in response to the introduction of fluid into the piston chambers 335, 340. The piston sleeve 375 includes a first piston surface 435 and a second piston surface 440.

As shown in FIG. 4A, the piston sleeve 375 is connected to the flow tube 320 via a releasable member 350. As will be described herein, the releasable member 350 will release the connection between the piston sleeve 375 and the flow tube 320 when the isolation valve 300 is moved to the locked position.

Referring back to FIG. 4, the isolation valve 300 is in the open position, which allows drill string and/or other tools to pass through a longitudinal central bore 310 of the isolation valve 300. To move the isolation valve 300 to the open position, fluid pressure is introduced into the second piston chamber 340 via the fluid channel 470. The fluid pressure in the second piston chamber 340 acts on the second piston surface 440 of piston sleeve 375, which moves the flow tube 320 in a first direction to open the isolation valve 300. To return to the closed position, fluid pressure is introduced in the first piston chamber 335 via the fluid channel 475, and the fluid pressure acts on the first piston surface 435 of the piston sleeve 375 which moves the flow tube 320 in a second opposite direction to slide the flow tube 320 out of interference with the flapper valve 305. In this manner, the isolation valve 300 is movable between the open position and the closed position multiple times by introducing fluid pressure in the respective piston chamber 335, 340.

As shown in FIG. 4A, a biasing member 360 is disposed between the flow tube 320 and the piston sleeve 375. The biasing member 360 is configured to allow the flow tube 320 to move relative to the piston sleeve 375 by compressing the biasing member 360. In one embodiment, the biasing member 360 is a wave spring. In other embodiments, the biasing member 360 may be an elastomer, a helical spring or any other type of biasing member known in the art. As also shown in FIG. 4A, a lock member 405, such as a lock ring, is disposed within the flow tube 320. The lock member 405 is compressed and held in place by a shear ring 410 disposed around an outer surface of the flow tube 320. As will be discussed herein, the lock member 405 is configured to interact with a groove 415 in the housing 315 when the isolation valve 300 is moved to a locked position.

FIG. 4B is an enlarged view of the engagement assembly 370. The engagement assembly 370 is configured to interact with the flow tube 320 when the isolation valve 300 is in the open position to substantially protect a flapper cavity 365 from debris that may restrict the operation of the flapper valve 305. As shown, the engagement assembly 370 includes a guide member 380 and a sleeve member 395 that are interconnected via a shearable member 390. In one embodiment, the guide member 380 includes a tapered surface that is configured to centralize a drill string and/or other tools passing through the longitudinal central bore 310 of the isolation valve 300. In addition, the engagement assembly 370 is configured to protect the end of the flow tube 320 from damage due to the movement of the drill string and other tools upward through the isolation valve 300. Since the engagement assembly 370 is the first (or lowest) component in the isolation valve 300, which is in contact with the drill string as the drill string moves upward through the bore 310 of the isolation valve 300, the engagement assembly 370 substantially shields the flow tube 320 from any damage that may occur.

As set forth herein, the piston sleeve 375 moves the flow tube 320 in a direction toward the engagement assembly 370 when fluid pressure is introduced into the second piston chamber 340 from the fluid channel 470. The flow tube 320 moves within the housing 315 until a lower portion 355 of the flow tube 320 is in contact with an upper portion 385 of the guide member 380. In one embodiment, the lower portion 355 of the flow tube 320 includes a shaped surface, such as a bull-nosed shape, which is configured to mate with a corresponding shaped surface on the upper portion 385 of the guide member 380. The flow tube 320 and the guide member 380 are optionally biased against each other to maintain contact between the flow tube 320 and the guide member 380 while the isolation valve 300 is in the open position. In the embodiment illustrated, the biasing member 360 (FIG. 4A) is used to bias the flow tube 320 against the guide member 380 of the engagement assembly 370. In other embodiments, the biasing member 360 may be placed at other locations in the isolation valve 300, such as between the components of the engagement assembly 370. In another embodiment, there may be more than one biasing member at various locations in the isolation valve 300. In this manner, the biased contact arrangement is used to maintain contact between the flow tube 320 and the guide member 380 to protect the flapper cavity 365 from debris that may restrict the operation of the flapper valve 305.

Figure 5:
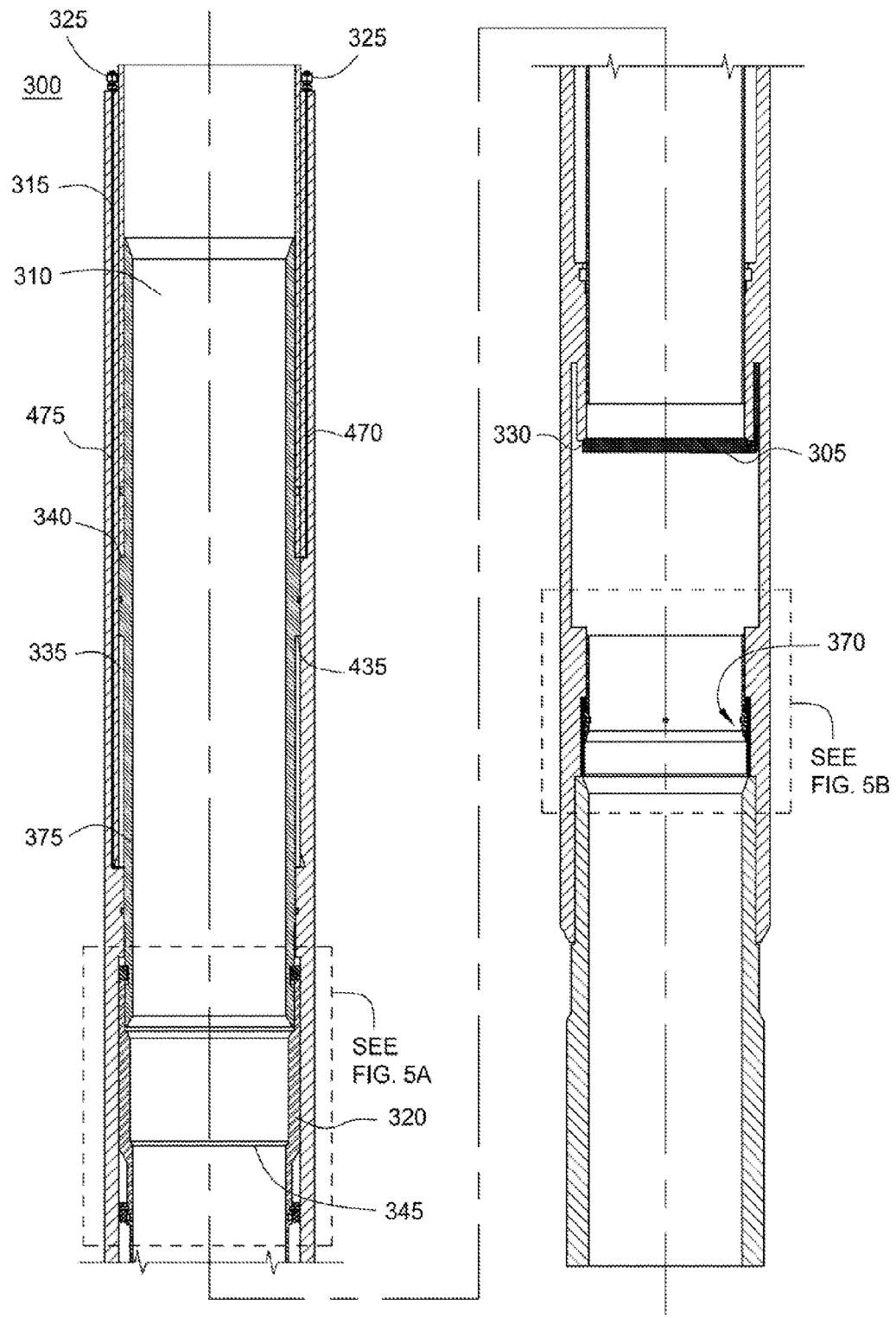
FIG. 5 is a cross-section view of the isolation valve in a closed position.

FIG. 5 illustrates a cross-section view of the isolation valve 300 in a closed position. As shown, the flapper valve 305 is obstructing the longitudinal central bore 310 through the isolation valve 300. To move the isolation valve 300 to the closed position, fluid pressure is supplied to the first piston chamber 335 through the fluid channel 475, which acts on the first piston surface 435 of the piston sleeve 375 to move the flow tube 320 out of interference with the flapper valve 305. The flapper valve 305 is biased toward the seat 330. Therefore, the movement of the flow tube 320 out of interference with the flapper valve 305 allows the flapper valve 305 to move toward the seat 330. In addition, the movement of the flow tube 320 through the housing 315 causes the flow tube 320 to disengage from the guide member 380 of the engagement assembly 370 (see FIG. 5B).

Figure 6:
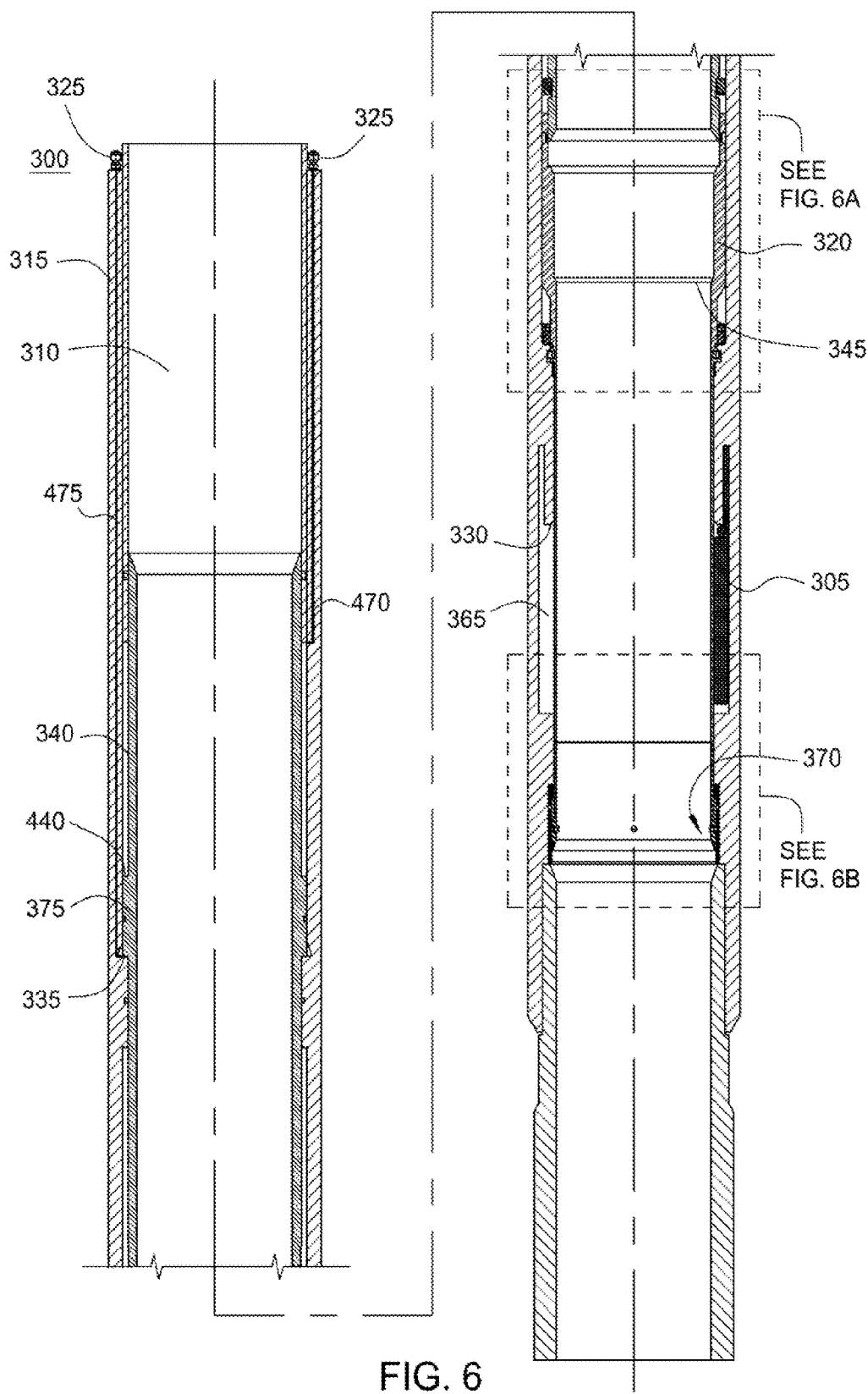
FIG. 6 is a cross-section view of the isolation valve in a locked position.

FIG. 6 illustrates a cross-section view of the isolation valve 300 in a locked position. The isolation valve 300 is movable between the open position and the closed position multiple times by introducing fluid pressure in the respective piston chamber 335, 340. The isolation valve 300 may also be locked in the open position by manipulating the location of the flow tube 320 by mechanical force. The flow tube 320 includes inner mating profiles 345 that enable engagement of the flow tube 320 with a corresponding profile tool (not shown) for manipulating the location of the flow tube 320. To permit free movement of the flow tube 320 relative to the piston sleeve 375, a predetermined force is required to break the releasable member 350 between the flow tube 320 and the piston sleeve 375. Upon application of the predetermined force, the releasable member breaks 350 into a first portion 350A and a second portion 350B (see FIG. 6A), which allows the flow tube 320 to move relative to the piston sleeve 375. In addition, the application of the predetermined force shears the ring 410. The movement of the flow tube 320 through the housing 315 also moves the lock member 405 to a location adjacent the groove 415 in the housing, and thereafter the lock member 405 engages the groove 415. The flow tube 320 is locked in the open position upon engagement of the lock member 405 in the groove 415. At this point, the flow tube 320 will no longer be able to move through the housing 315 to close the isolation valve 300. As shown in FIG. 6B, the movement of the flow tube 320 through the housing causes the flow tube 320 to contact and act on the guide member 380, which causes the member 390 to shear. Thereafter, the guide member 380 moves relative to the sleeve member 395 to accommodate the extra travel required for the flow tube 320 during the locking operation.

FIGS. 7A-7C illustrate a hinge arrangement 425 for the flapper valve 305. As shown in FIG. 7A, the hinge arrangement 425 connects the flapper valve 305 to the housing 315. During the manufacturing process of the isolation valve 300, the flapper valve 305 is aligned to allow for proper engagement of the flapper valve 305 and the seat 330. The seat 330 may be part of the housing 315, or the seat 330 may a separate component in the isolation valve. The design permits for small alignment movement along a seat/hinge mating surface 430 due to the connection members. Once the hinge arrangement 425 is aligned, the hinge arrangement 425 is fastened to the housing 315 by a plurality of connection members 420, such as screws. Further, an adjustment locking connection member 445 may be used to fine tune the alignment of the hinge arrangement 425 and/or to prevent axial direction movement along the plane of the seat/hinge mating surface 430. As shown in FIG. 7C, the adjustment locking connection member 445 is attached to a portion of the housing 315, and the adjustment locking connection member 445 is tightened in a direction along the plane of the seat/hinge mating surface 430 and therefore prevents axial direction movement along the plane of the seat/hinge mating surface 430. Additionally, as shown in FIG. 7C, a safety connection member 495, such as a screw, snap ring or pin, is disposed at a location adjacent the adjustment locking connection member 445. The safety connection member 495 is configured to substantially prevent the adjustment locking connection member 445 from inadvertently falling out during operation of the flapper valve 305. Although the hinge arrangement 425 was described in relation to the flapper valve 305, the hinge arrangement 425 applies to other valves such as the flapper 105.

Figure 8:
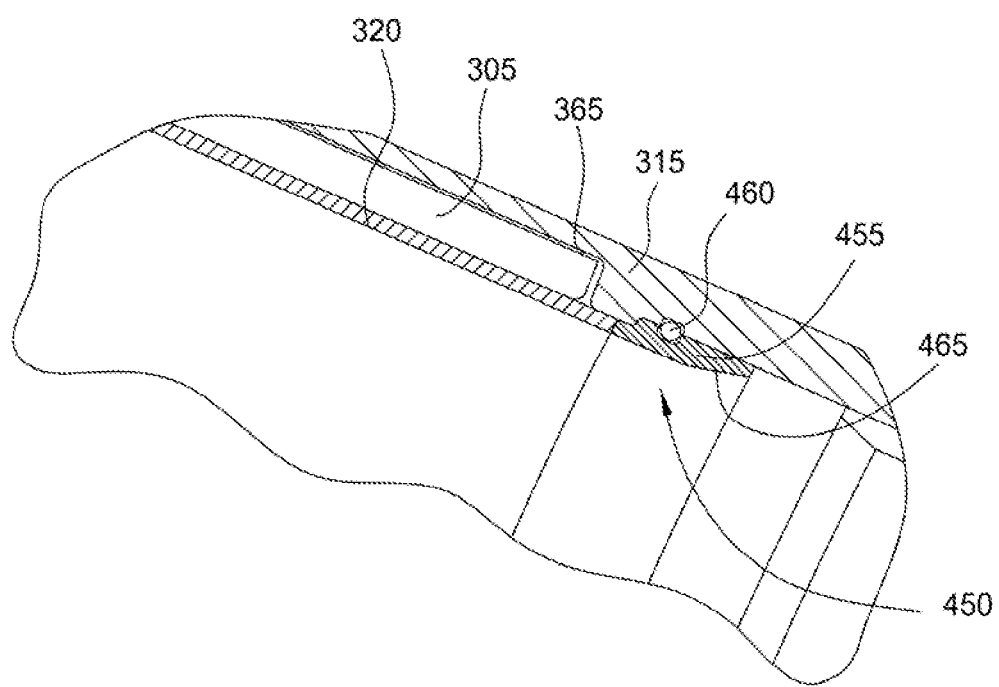
FIG. 8 is a cross-section view of an engagement assembly.

FIG. 8 is a cross-section view of an engagement assembly 450. The engagement assembly 450 functions in a similar manner as described herein with regards to the engagement assemblies 170, 370. The primary difference is that the engagement assembly 450 is made from a single piece rather than two pieces (e.g., guide member and sleeve member). The engagement assembly 450 is attached to the housing 315 via a connection member 460, such as a resilient connection member (e.g. o-ring) or a non-resilient connection member (e.g. shear screw). One advantage of the connection member 460 being a resilient connection is that the connection member 460 may be used to bias the engagement assembly 450 in contact with the flow tube 320 while the isolation valve 300 is in the open position. The engagement assembly 450 includes a tapered surface 465. The engagement assembly 450 is configured to take impact from a drill string and direct the drill string (using the tapered surface 465) into the inner diameter of the flow tube 320, thereby protecting the end profile of the flow tube 320. The engagement assembly 450 also directs debris into the inner diameter of the flow tube 320 to prevent packing off of the flapper cavity 365.

Similar to as described herein, the engagement assembly 450 is configured to interact with the flow tube 320 when the isolation valve 300 is in the open position in order to protect the flapper cavity 365 from debris that may restrict the operation of a flapper valve 305. To maintain contact between the flow tube 320 and the engagement assembly 450 while the isolation valve 300 is in the open position, one or both of the flow tube 320 and the engagement assembly 450 are biased toward each other. Additionally, when the isolation valve 300 is moved to the locked position, the flow tube 320 contacts and acts on the engagement assembly 450, which causes the member 460 to shear to accommodate the extra travel required for the flow tube 320 during the locking operation.

While the foregoing is directed to embodiments of the present invention, other and further embodiments of the invention may be devised without departing from the basic scope thereof, and the scope thereof is determined by the claims that follow.

The invention claimed is:
1. An isolation valve for use as part of a casing string, the isolation valve comprising:
   a housing having a bore and a valve cavity;
   a valve member movable between a first position in which the valve member obstructs the bore of the housing and a second position in which the valve member is disposed in the valve cavity, the valve member having a locked position in which the valve member is locked in the valve cavity;
   a flow tube configured to allow movement of the valve member between the first and second positions;
   a piston coupled to the flow tube;

an engagement assembly attached to the housing by a shearable member, the piston configured to move the flow tube into engagement with the engagement assembly to substantially prevent debris from entering the valve cavity when the valve member is in the second position, and configured to move the flow tube out of engagement with the engagement assembly when the valve member is in the first position, wherein the engagement assembly is movable relative to the housing upon release of the shearable member when the valve member is in the locked position; and a compression spring disposed between the piston and the flow tube and configured to bias the flow tube into contact with the engagement assembly when the valve member is in the second position.

2. The isolation valve of claim 1, wherein an end of the flow tube includes a shaped surface that is configured to contact a surface on the engagement assembly.

3. The isolation valve of claim 1, wherein the engagement assembly includes a guide member and a sleeve.

4. The isolation valve of claim 3, wherein the guide member includes a tapered portion that is configured to centralize wellbore tools moving through the bore of the housing.

5. The isolation valve of claim 1, wherein the piston is connected to the flow tube via a releasable connection.

6. The isolation valve of claim 5, wherein the piston is configured to move the flow tube within the housing when fluid pressure acts on the piston.

7. The isolation valve of claim 5, wherein the valve member is configured to be locked in the second position when the connection between the piston and the flow tube is released and a connection is formed between the flow tube and the housing.

8. The isolation valve of claim 1, further comprising a hinge arrangement having a first portion connected to the valve member and a second portion operatively connected to the housing.

9. The isolation valve of claim 8, wherein the second portion includes a hinge mating surface in contact with the housing.

10. The isolation valve of claim 9, wherein the hinge arrangement includes a locking connection member that is configured to prevent axial direction movement along a plane of the hinge mating surface during operation of the valve member.

11. The isolation valve of claim 1, wherein the engagement assembly is biased into contact with the flow tube.

12. The isolation valve of claim 1, wherein the shearable member is a shear pin.

13. A method of operating an isolation valve in a wellbore, the method comprising:

placing the isolation valve in the wellbore, the isolation valve including a housing, a valve member, a flow tube, a piston coupled to the flow tube, a compression spring disposed between the piston and the flow tube, and an engagement assembly, the engagement assembly attached to the housing by a shearable member;

moving the valve member from an opened position to a closed position by moving the flow tube via the piston in a first direction through the housing, the flow tube being disengaged from the engagement assembly;

moving the valve member from the closed position to the opened position by moving the flow tube via the piston in a second direction, wherein the compression spring biases an end of the flow tube into contact with an end of the engagement assembly; and moving the valve member to a locked position by moving the flow tube further in the second direction which releases the shearable member and causes the engagement assembly to move in the second direction relative to the housing.

14. The method of claim 13, further comprising biasing the flow tube against the engagement assembly using the biasing member.

15. The method of claim 13, further comprising releasing a connection between the flow tube and the piston, which allows the flow tube to move independently from the piston.

16. The method of claim 15, further comprising forming a connection between the flow tube and the housing to maintain a flow path through the isolation valve.

17. The method of claim 13, wherein the shearable member is a shear pin.

18. An isolation valve comprising:
a housing having a bore;
a flapper pivotally movable between a closed position in which the bore is blocked and an open position in which the bore is open to fluid flow;
a flow tube for shifting the flapper between the open position and the closed position;
a piston coupled to the flow tube;
an engagement assembly attached to the housing by a releasable resilient connection member, the engagement assembly having an end configured to abut an end of the flow tube after the flow tube moves the flapper to the open position; and
a compression spring disposed between the piston and the flow tube and configured to bias the flow tube into contact with the engagement assembly when the flapper is in the open position wherein the flow tube is movable to a further location in the housing thereby displacing the engagement assembly and locking the flapper in the open position.

19. The isolation valve of claim 18, wherein the releasable resilient connection member is configured to bias the engagement assembly into contact with the flow tube while the flapper is in the open position.

20. The isolation valve of claim 18, wherein the releasable resilient connection member is configured to be released when the valve member is moved to a locked position.

* * * * *